F. O. Matthiessen,
Globe-Valve.
No. 92,857.          Patented Jul. 20. 1869
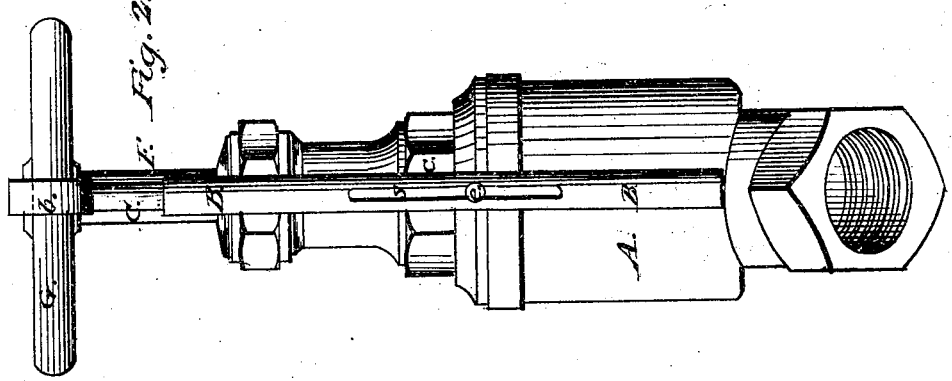
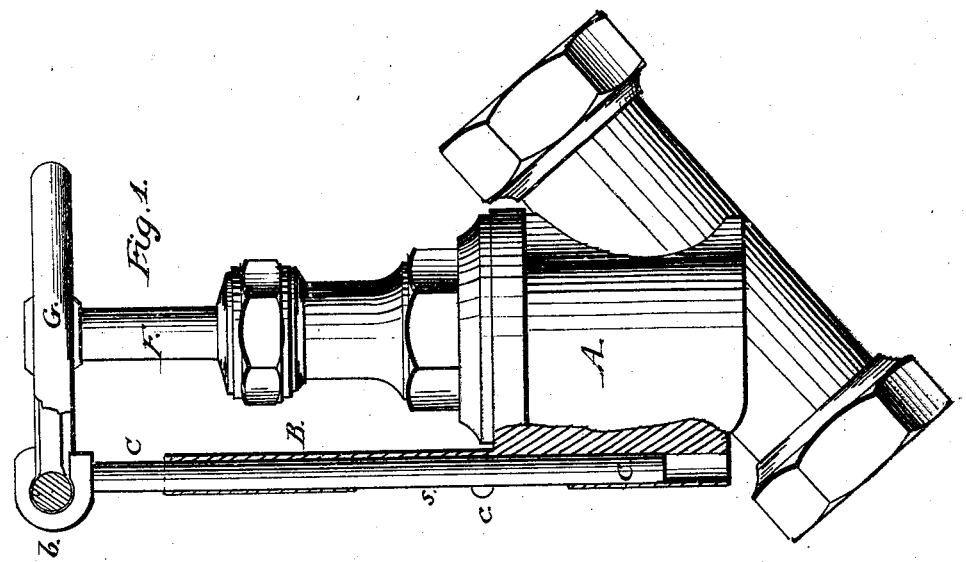
Attest:
Henry T. Brown
M. Coomly
Inventor:
F. O. Matthiessen

United States Patent Office.

FRANZ O. MATTHIESSEN, OF JERSEY CITY, NEW JERSEY.

Letters Patent No. 92,857, dated July 20, 1869.

IMPROVEMENT IN GLOBE-VALVES.

The Schedule referred to in these Letters Patent and making part of the same.

*To all whom it may concern:*

Be it known that I, FRANZ O. MATTHIESSEN, of Jersey City, in the county of Hudson, and State of New Jersey, have invented a new and useful Improvement in "Globe and other Valves;" and I do hereby declare that the following is a full, clear, and exact description of the same, reference being had to the accompanying drawings, which form part of this specification.

This invention, though more especially designed for globe and such other valves as are operated by a threaded valve-stem, may also be applicable to valves of other constructions.

An inconvenience heretofore attending the use of such valves, has been not only the difficulty of ascertaining by the eye whether the valve is opened or closed, but also when found to be open, to ascertain, with any degree of certainty, the extent to which it is opened.

The object of this invention is to obviate this inconvenience; and, to this end, It consists in a valve-indicator, composed of a pointer and a graduated scale, the one being operated by the rectilinear movement of the valve-stem, and the other attached to the fixed casing of the valve, so that the position of the one relative to that of the other, will be varied by the said rectilinear movement of the stem, whereby the exact position of the valve-plug relative to that of the valve-seat may be ascertained.

Referring to the accompanying drawings—

Figures 1 and 2 represent views of a steam-valve, provided with my valve-indicator, taken at right angles to each other.

Similar letters of reference indicate corresponding parts in both figures.

A is the outer case or boxing of the valve, to which is attached a tubular socket, B.

Said socket B is arranged parallel with the valve-stem F, and has formed in it an elongated slot, S, opposite which is marked a graduated scale, $f$, for a purpose hereinafter explained.

Fitted to slide within this tubular socket B, and carried upon the rim of the hand-wheel G, by means of a yoke, $b$, is an indicator, C, so that by the rectilinear movement of the stem, the said indicator is caused to slide back or forth within the tubular socket B, the rim of the hand-wheel sliding freely through the said yoke $b$.

Screwed into, or otherwise secured to the said indicator C, so as to project through the slot S, is a pointer, $c$. Said pointer $c$ is arranged to stand opposite the lower extremity or beginning of the scale $f$, while the valve is closed, so that by the sliding of the indicator within the socket, the pointer $c$, by being brought opposite different parts of the graduated scale, may indicate with accuracy the position of the valve-plug relative to that of its seat.

What I claim as my invention, and desire to have secured by Letters Patent, is—

1. The slotted socket B, having a graduated scale, $f$, and the sliding indicator C, having a pointer, $c$, and a yoke, $b$, combined for operation in connection with the fixed case A, and the hand-wheel G, substantially as and for the purpose herein set forth.

2. The construction and arrangement of the socket B, and indicator C $c$, in relation to the valve-case A, and hand-wheel, G, substantially as set forth.

F. O. MATTHIESSEN.

Witnesses:
HENRY T. BROWN,
EDWD. ADAMS.